United States Patent [19]
Akin et al.

[11] 3,854,014
[45] Dec. 10, 1974

[54] CALL BACK ARRANGEMENT

[75] Inventors: Robert J. Akin; Otto Altenburger, both of Rochester, N.Y.; Robert H. Bansemir, Northlake, Ill.

[73] Assignee: Stromberg-Carlson Corporation, Rochester, N.Y.

[22] Filed: Apr. 13, 1973

[21] Appl. No.: 351,121

[52] U.S. Cl. .......... 179/18 BG
[51] Int. Cl. .......... H04m 3/48
[58] Field of Search .......... 179/18 BG, 18 AB, 84 B, 179/84 C, 18 B, 27 FD

[56] References Cited

UNITED STATES PATENTS

| | | | |
|---|---|---|---|
| 2,921,138 | 1/1960 | Baker et al. | 179/18 BG |
| 3,214,523 | 10/1965 | Hess | 179/18 BG |
| 3,707,605 | 12/1972 | Lee et al. | 179/18 BG |

FOREIGN PATENTS OR APPLICATIONS

| | | | |
|---|---|---|---|
| 814,118 | 4/1957 | Great Britain | 179/18 BG |

*Primary Examiner*—Kathleen H. Claffy
*Assistant Examiner*—C. T. Bartz
*Attorney, Agent, or Firm*—William F. Porter, Jr.; Charles C. Krawczyk

[57] ABSTRACT

A call back arrangement for common control telephone systems, which in response to signal from a calling station after a dialed connection to a called station failed to complete, automatically seizes the called station line when it is free without ringing the called station and thereafter automatically completes a connection between the calling and called stations.

19 Claims, 7 Drawing Figures

CALL BACK ARRANGEMENT

BRIEF DESCRIPTION OF THE INVENTION

A call back arrangement for telephone systems, responsive to a signal from a calling station, for automatically attempting to complete a connection between the calling station and a called station that was previously unsuccessfully attempted. Means, responsive to the determination that the connection was unsuccessfully attempted and responsive to the signal from the calling station, for determining when the called station is free for seizing the called station line without ringing the called station thereby reserving the called station line for the call back attempt. Upon the seizure of the called station, a connection between the calling station and the called station is attempted, and if successful, the calling station is rung, and upon answer thereof, the called station is rung. If the attempt to establish a connection to the calling station fails, the process is repeated at a later time. This arrangement has the advantage of first determining that the called station is free before attempting the call back connection thereby assuring the connection can be completed before the calling party is rung. In addition to the foregoing, the called station line is seized when found to be free thereby preventing another connection to the called party while establishing the call back connection.

BACKGROUND OF THE INVENTION

This invention pertains to telephone systems and more particularly to a call back service for telephone switching systems for automatically establishing a connection between parties that was previously unsuccessfully attempted.

Quite often telephone calls are not successfully completed because the called party line is busy due to another previously established connection. Many times the final connection is completed only after several previously unsuccessful attempts. These repeated attempts by the calling party, in addition to being time consuming and therefore expensive, are also frustrating and at times may result in the abandonment of the call. Furthermore, the calling party's line is also undesirably tied up while attempting to make these calls, thereby at many times preventing calls to the calling party. To the telephone company this means added traffic, further wear on the equipment, and a possible loss of revenue. A call back service that can be provided on a per subscriber basis would be highly advantageous, both from the subscriber's point of view and that of the telephone company. The subscriber can, by paying additional revenue, be provided with a class of service that would entitle the subscriber to be connected to equipment for automatically attempting to establish unsuccessfully previously attempted connections. The telephone company, in addition to receiving additional revenue, can with call back equipment, reduce traffic and wear on its system.

Various call back or call retrying arrangements have been developed in the prior art. In one such arrangement, the calling party, after failing to complete a call, hook flashes and dials the called number into a memory. After a preset time interval, the call back arrangement first establishes a connection to the calling party and, after the calling party answers, automatically attempts to make a connection to the called party. If the called party is busy, or does not answer, the attempt is abandoned and the calling party is again offered the opportunity of having the call automatically established. This procedure is repeated as many times as desired until the call is either successfully completed or abandoned by the calling party. Another type of prior art call back or retry system makes successive repeated attempts to make the connection while the calling party is off hook and sends signals to the calling party for each attempt to establish the connection for as long as the calling party remains off hook.

The arrangements of the prior art require that either the calling party stays off hook, or else that the calling party be brought into the connection prior to establishing a retry attempt. It is therefore apparent that a need exists for an improved call back arrangement that is fully automatic and that will establish a connection only when both parties are free. Furthermore, the call back arrangement should include provision for first establishing that the called party is free, for seizing the called party without ringing, and then ringing the calling party so that once the calling party answers, the connection to the called party can be assured to be completed. Under such an arrangement, the calling party need merely attempt a call, and if the called party is busy, arrange for call back services and hang up. The connection should be automatically established only after both parties are free to minimize the manual requirements on the calling party for requesting call back services and so that the calling party is required to answer his telephone set only when a connection has been verified and can be established.

It is therefore an object of this invention to provide a new and improved call back arrangement for telephone systems.

It is also an object of this invention to provide a new and improved call back arrangement for telephone systems that will automatically interconnect the calling and called parties when both are free.

It is still a further object of the invention to provide a new and improved call back arrangement for telephone systems that first verifies that the called party is free before signalling the calling party.

It is another object of this invention to provide a new and improved call back arrangement for telephone systems that seizes the line of the called party, thereby assuring that the call can be established before ringing the calling party.

BRIEF DESCRIPTION OF THE DRAWINGS

Other objects, features and advantages of the present invention will become apparent from the following description of a preferred embodiment, taken together with the attached drawings thereof, in which.

DESCRIPTION OF THE PREFERRED EMBODIMENT

Figure 1:
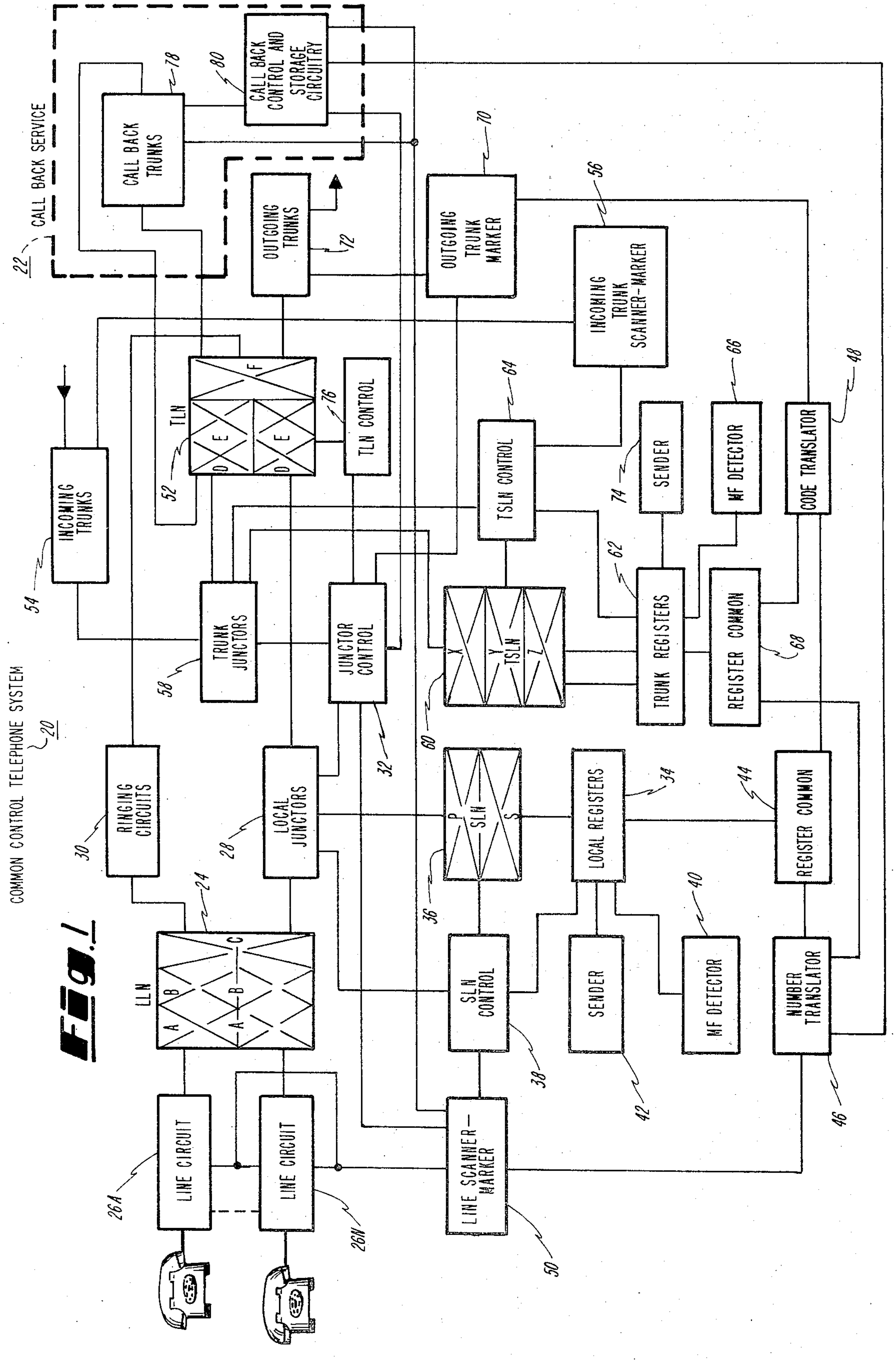
FIG. 1 includes a basic block diagram of a common control telephone system embodying the automatic call back system of the present invention.

Referring now to FIG. 1, there is shown a block diagram of a common control telephone system generally designated 20, including an automatic call back control system constructed in accordance with the invention and generally designated 22.

Common control switching system 20 includes a line link network (LLN) 24 which functions as a concentrator for originating line calls and as a fan-out for terminating calls. The LLN consists of three stages of matrices (A, B, and C), is used for both originating and terminating types of traffic and is connected at one end to a plurality of line circuits 26*a*–26*n*, which vary in number depending upon the telephone service to be offered. Line circuits 26*a*–26*n* are more fully described in U.S. Pat. No. 3,708,627, entitled, "Plug-In Line Circuit Arrangement," filed on June 15, 1971, in the name of Otto Altenburger and assigned to the assignee of the present invention. LLN 24 provides a unique path between circuits connected to opposite ends of the network. Each of the switching networks in FIG. 1 includes matrix switches consisting of relays, each having a mark or control winding for initially actuating the relay and a hold or sleeve coil connected in series with its own contacts for maintaining the relay in an actuated condition after a path through the network has been established.

The C stage of LLN 24 provides the termination for both originating traffic from line circuits 26*a*–26*n* and incoming traffic to the line circuits. These terminations of LLN 24 are connected to local junctors 28 for originating traffic and to ringing controls 30 for terminating traffic. The number of local junctors and ringing controls provided depends upon the traffic requirements for this system. The ringing controls are more fully described in U.S. Pat. No. 3,671,678, entitled, "Ringing Control Circuit," filed on Dec. 22, 1970, in the name of Otto Altenburger and assigned to the assignee of the present invention. Local junctor circuits 28 and their control (by junctor control 32) are more fully described in U.S. Pat. No. 3,705,268, entitled, "Passive Junctor Circuit And Selectively Associated Junctor Control," filed on Dec. 22, 1970, in the name of Otto Altenburger and assigned to the assignee of the present invention.

Local junctors 28 serve as a focal point for all originating type traffic, include provisions for connecting the line circuits to local registers 34 via a service link network (SLN) 36 and provisions for providing transmission battery for calling and called parties on intraoffice calls and are under the control of the calling party. When trunk or station busy conditions are encountered, the local junctors 28 provide the busy tone to the calling party.

Service link network 36 includes two stages of matrices (P and S) and is controlled by a SLN control circuit 38 for connecting the calling line circuits 26*a*–26*n* (via one of the local junctors 28) to one of the plurality of local registers 34 which, when connected to local junctors 28, provide dial tone and include apparatus for acting on the instructions of the subscriber. Local junctors 28 terminate at the S stage. The dial pulse acceptors function as an interface between local junctors 28 and the local registers 34. The dial pulse acceptors (DPA's) provide the dial tone to the calling subscriber and also detect rotary dial pulses and extend the pulses to storage sections in local registers 34. In the event of multifrequency signalling by the subscriber, the frequencies are detected by MF detectors 40 connected to dial pulse acceptors. The local registers 34 consist of a DPA, register storage and register output and are connected to a sender 42 for providing outpulsing. The registers and senders are controlled by register common 44 which contains the necessary control units. Local registers 34 are connected to the register common 44 on a time division multiplex basis wherein information is passed from one equipment to another on a common bus basis. Register common 44 is also connected to communicate with a number translator 46 and a code translator 48 on a time division multiplex basis. The translation circuits provide information such as equipment number, ringing code and class of service (COS). The number translator 46 is connected to a line scanner-marker circuit 50 which has the means to detect service requests and means to access the individual line circuits 26*a*–26*n*.

The ringing controls 30 connect ringing generators to terminating or called stations, detect off-hook conditions (ring-trip) of the called station and provide ringback tone for the calling station. Each line circuit can be connected to a plurality of ringing controls which are accessed from a trunk link network (TLN) 52 so that a ringing control is automatically connected to the terminating line circuit as soon as a connection to that line is complete.

Line scanner circuit 50 continuously checks line circuits 26*a*–26*n* for an off-hook condition. The line circuits 26*a*–26*n* are more fully described in U.S. Pat. No. 3,708,627, entitled, "Plug-In Line Circuit Arrangement," filed on June 15, 1971, in the name of Otto Altenbburger and assigned to the assignee of the present invention. Line scanner-marker circuit 50 is also used for both the originating and for terminating types of traffic. In the event of originating traffic, the line scanner stops when an off-hook condition is connected and trasmits the information from its counter circuits to a marker circuit to mark the particular line circuit 26*a*–26*n* and enables SLN control 38 to initiate a path finding operation between an available local register and the line circuit requesting service. In the event of terminating traffic, line scanner 50 is controlled by number translator 46 and receives an equipment number from number translator 46 to mark the line circuit 26*a*–26*n* with the particular equipment location and in addition, in terminating traffic, line marker 50 also transmits the terminating subscriber classes of service, ringing code, busy or idle status and types of ringing required through junctor control 32 to ringing control 30.

Line scanner-marker circuit 50 is more fully disclosed in U.S. Pat. No. 3,699,263, entitled, "Line Scanner and Marker Using Group Scanner," filed on Dec. 23, 1970, in the names of Gunter Neumeier and Otto Altenburger and assigned to the assignee of the present invention.

In operation, when a calling telephone goes off-hook, line scanner-marker 50 detects the off-hook condition and marks the line circuit connection to the A stage of LLN 24. Simultaneously, line scanner-marker circuit 50 signals SLN control 38 to begin a path finding process for connecting the marked line circuit to one of local registers 34. SLN control 38 detects and locates a path in a three step scanning process. During the first scan, the existence of a free path between a free local register 34 and the line circuit is located and the free local register 34 and its corresponding stage S matrix module is identified. During the second scan, a free path through a P stage matrix module is identified. Finally, during the third scan, a free local junctor 28 is identified. The connection of the local junctor 28 to LLN 24 and the connection through SLN 36 are now completed. When path finding is complete, the relay coils of the selected matrix in LLN 24 and SLN 36 are energized. The metallic connections through the tip and ring leads are checked, and if the connection is complete the sleeve coil connections are effected and the connected local junctor 28 is seized. At this time, SLN control 38 and line scanner-marker circuit 50 are released, and the local register 34 is connected to the subscriber to receive dialed information. Once the subscriber information has been dialed into a local register 34, the call must be routed either internally to another local subscriber or externally to another exchange.

Incoming calls from other exchanges are applied to one of a plurality of incoming trunk circuits 54. Incoming trunk scanner-marker circuit 56 continuously scans the incoming trunk circuits 54 for a seized incoming trunk and, when such a seized trunk is located, a scanner circuit stops and transmits the trunk equipment number to a marker circuit, identifying the particular incoming trunk circuit 54. The identified incoming trunk circuit 54 is connected to a trunk junctor 58 (which is essentially identical to a local junctor 28, but is connected between the incoming trunk circuit 54, TLN network 52 and a trunk service line network — TSLN 60). Trunk junctor 58 functions as a focal point for all incoming traffic, includes provisions for connecting the incoming trunk circuit 54 to any one of a plurality of trunk registers 62 via TSLN 60, provides incoming and called parties with transmittion battery and, when encountering either trunk or station conditions, returns a busy tone to the incoming call.

A TSLN control 64 is provided and is arranged to locate a path between trunk junctors 58 and trunk registers 62. Trunk junctors 58 are terminated on the X stage matrix modules of TSLN 60 and trunk registers 62 are terminated on the Z stage matrix modules. TSLN 60 is divided into a number of separate grids. The incoming trunk scanner-marker circuit 56 signals TSLN control 64 which of the grids will be used for accessing one of trunk registers 62 as determined by the trunk junctor 58 involved in the connection. Trunk registers 62 include a dial pulse acceptor interface and subcircuits including a register storage and register output. A multifrequency detector 66 is also connected to trunk registers 62 and the subcircuits in trunk register 62 and multifrequency detector 66 are controlled by a register common control 68 on a time division multiplex basis. The register common 68 is connected to communicate with number translator 46 and code translator 48 on a time division basis. Code translator 48 is connected to an outgoing trunk marker circuit 70 and is arranged to identify outgoing trunk groups 72 and is more fully explained in copending patent application Ser. No. 103,267, now U.S. Pat. No. 3,732,377 entitled, "Outgoing Trunk Marker," filed on Dec. 31, 1970, in the names of Otto Altenburger and David Stoddard and assigned to the assignee of the present invention. A sender circuit 74 is also connected to the trunk register 62 to provide outgoing pulsing.

Since trunk junctors 58 are identified by the incoming trunk scanner-marker circuit 56, only a two step scan is required in the path finding scheme of TSLN control 64. During the first scan a free path between a free trunk register 62 and the seized trunk junctor 58 is located, the free trunk register 62 is identified and marked and the connected Z stage module is identified. During the second scan, a free path through the X and Y stage matrix modules to the marked trunk junctors 58 is located, the mark relay coils through the Y and Z stage matrix modules are energized and the mark relay coils through the Z stage matrix modules to the marked trunk register 62 are energized. When the connection between the trunk junctors 58 and the trunk registers 62 is completed, the metallic connections through the tip and ring leads are checked and the sleeve connections are completed. TSLN control 64 and incoming trunk marker 56 are then released. When the incoming information has been received by one of trunk registers 62, the call is either routed internally to a local subscriber or externally to other exchanges via an outgoing trunk 72.

TLN 52 is arranged to provide for termination of local traffic to local subscribers, termination of incorming calls from other exchanges to local subscribers and connections of incoming calls from external exchanges to other external exchanges. TLN 52 includes D and E stage matrix modules and, when further expansion is required, an F stage matrix module. The D stage provides an entrance to TLN 52 and is connected to local junctors 28 and to trunk junctors 58. The exit from TLN 52 is provided by the F stage which is connected via ringing circuits 30 to LLN 24 and to outgoing trunks 72.

A TLN control 76 and junctor control 32 provide path finding through TLN 52 for both internally terminated calls and outgoing calls to a distant office. Number translator 46 and line scanner-marker 50 are utilized to complete calls to local lines, and code translator 48, together with outgoing trunk marker 70, complete calls to trunks. The path finding operation of TLN control 76 includes a two step scan. A local junctor 28, or a trunk junctor 58, has been previously marked (depending upon whether the call being terminated is an incoming call or a locally generated call). In addition, the information in the local or trunk register is transmitted from the register via register common 44 or 68 to either number translator 46 or code translator 48 (again depending upon whether the call is being terminated to a local subscriber or to a distant exchange, respectively). In the event of a call terminating to a local subscriber, number translator 46 marks the line circuit of the terminating call via line scanner-marker circuit 50. In the event of an outgoing call, code translator 48 marks the particular outgoing trunk group 72 via outgoing trunk marker circuit 70. The first scan of TLN control 76 detects a free path through TLN 52 either to the marked outgoing trunk 72 or via a ringing circuit 30 and LLN 24 to a line circuit 26a–26n and identifies the E stage matrix module (the D stage matrix module is previously identified by the seized local or trunk junctor). The second scan identifies and marks the input to the F stage matrix module, completes the connection back through the D and E stage matrix modules to the marked junctor by energizing the matrix mark relay coils and also provides power through the F stage module and LLN 24 to energize the mark relay coils. After a metallic path check is made via the tip and ring leads, the sleeve connections are picked up to complete the connection through TLN 52.

The ringing control 30 now rings the called party. The connections through LLN 24 and TLN 52 and the local or trunk junctors 28 or 58 are maintained during the call under the control of the calling party. When the calling party hangs up, all connections are broken. Should the calling party still remain off-hook after the called party hangs up, provisions are included in the junctor circuits to break the connections after a predetermined period of time.

The interconnection and operation of the common control switching system are more fully described in a copending patent application, entitled, "Path Finding System," Ser. No. 153,221, filed on June 15, 1971, in the names of Otto Altenburger and Robert Bansemir and assigned to the assignee of the present invention.

The automatic call back arrangement or system 22 includes a plurality of call back trunks 78 connected to a call back control and storage circuit 80 and the TLN 52. Each of the call back trunks 78 has a single port connection to the F stage of TLN 52 for an initial connection to the calling party for reserving a call back trunk 78 for call back services, and two port connections to the D stage of the TLN for completing the call back connections through the call back trunks 78. When a calling party 26a–26n with a call back class of service dials a number of a busy called party into a local register 34, the line scanner-marker 50, under control of number translator 46, marks the F stage ports of all free call back trunks 78 and also enables the junctor control 32 to initiate a connection through the TLN 52 between the local junctor 28 connected to the calling line 26a–26n and one of the free call back trunks 78. During the connection process, a memory circuit in the call back control 80 receives the identities (equipment numbers) of the calling and called stations from the number translator 46, which in turn, are stored in the Y-address of a memory X address that is dedicated to the connected call back trunk 78.

When the connection is complete, the call back trunk 78 sends a busy signal to the calling station. The calling party can now either hang up and the connection will be disconnected, or he can dial a call back code, such as the number 9, to request call back service. The call back trunk 78 now removes the busy signal to indicate that a call back trunk has been reserved for call back services. When a call back code is detected by the connected call back trunk 78, the trunk is preset or reserved for automatically attempting to reconnect the stations identified by the data stored in the memory X-address associated with the call back trunk.

The call back control 80 sequentially scans the memory to locate a call back trunk 78 reserved for call back services. When the call back control 80 detects (by the presence of a TIL signal) that translator 46 is not serving any local register 34, the call back control 80 enables the line scanner-marker 50 to mark the line circuit of the called party and enables the junctor control 32 to complete a connection through TLN 52 between the D port of the call back trunk 78 and the called line circuit. A premature ring trip (PRT) signal is applied to the ringing control 30 so that the called party is not rung. When the connection between the call back trunk 78 and called party is complete, the call back trunk 78 signals the call back control 80 to enable the line scanner-marker 50 to mark the line circuit 26a–26n of the calling party and enable the junctor control 32 to complete a connection through TLN 52 between the other D stage port of call back trunk 78 and the calling party. A premature ring trip signal is applied to the ringing circuit 30 and ringing is provided to the calling line 26a–26n by the call back trunk 78. Simultaneously therewith, a call waiting tone is applied by the call back trunk 78 to the called line circuit, in the event the called party should go off hook, to indicate that a call back connection is in the process of being established. When the calling party answers, the call waiting tone is removed from the called line and a ringing signal is applied to the called line circuit by the call back trunk 78. When the called party answers the call back connection is completed through the call back trunk 78. When the call back connection is established, the call back trunk 78 is released from its preset or reserved mode of operation and the call back connection is then maintained under the control of the calling station.

Figure 2:
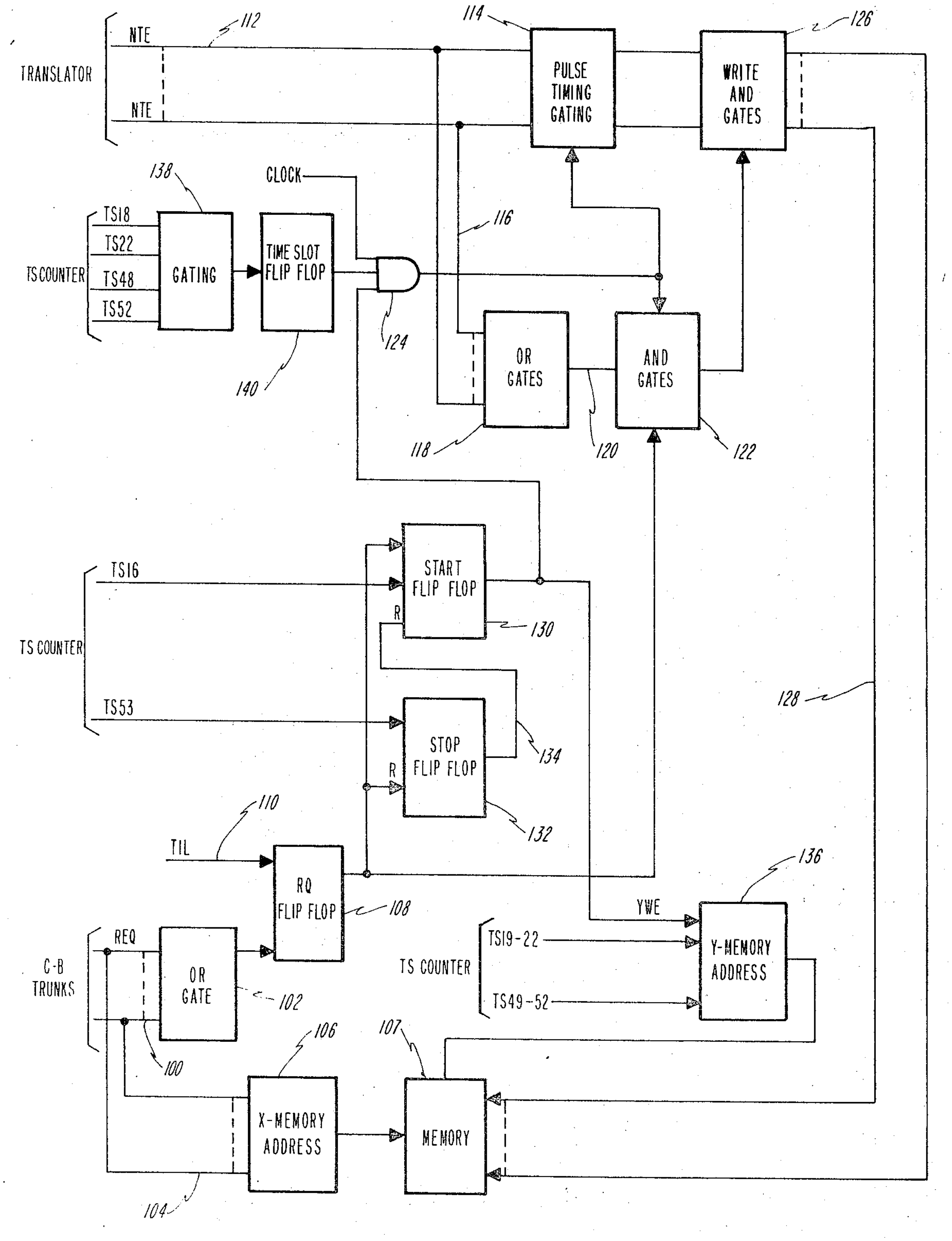
FIG. 2 is a block diagram showing the steering-in control and memory of the call back system arranged for information storage after seizure of a call back trunk.

Referring now to FIG. 2, the storing of call back information into the call back memory during seizure of the call back trunks 78 will be described in greater detail. After a call back trunk 78 has been seized, it transmits a request store (REQ) signal over one of lines 100 to an OR gate 102 and over one of lines 104 to the memory X-address 106 (the X and Y-addresses of the memory 107 are shown separately therefrom for purposes of illustration). If any of the plurality of (sixteen) call back trunks 78 transmits a REQ signal, the OR gate 102 is enabled and sets a request (RQ) flip-flop circuit 108 (when the number translator 46 is busy and a TIL signal is present on line 110). The equipment numbers of the calling and called lines are present on NTE leads 112 from the number translator 46 and are applied to a pulse timing gating circuit 114 and via lines 116 to a plurality of OR gates 118. When the information is present on NTE lines 112, an OR gate 118 is enabled and has an output on line 120 to a plurality of AND gates 122. A second input to each of AND gates 122 is the output of the request flip-flop circuit 108 and the AND gates 122 together with the pulse timing gating circuit 114, are enabled when an AND gate 124 is enabled. when the pulse timing gating circuit 114 is enabled, the information on the NTE lines 112 is gated to a plurality of write AND gates 126 and AND gates 126 are enabled to write the data into the memory 107 over lines 128 when the write AND gates 126 are enabled. When the request flip-flop circuit 108 is set it has an output which enables a start flip-flop circuit 130 and resets a stop flip-flop circuit 132. The start flip-flop circuit 130 is set by a time slot TS16 pulse and is reset via line 134 when the stop flip-flop circuit 132 is enabled. The time slots are call back system timing signals used in synchronizing the operation of the call back system 22 with the operation of the number translator 46 and are provided by the system timing circuit. There are sixty-four time slots in a timing sequence TS1-TS64. The stop flip-flop circuit 132 is set by a time slot TS53 pulse. When the start flip-flop circuit 130 is set it transmits a Y write enable (YWE) signal to the memory Y-address 136. During time slots TS19 – TS22 the memory Y-address 136 is enabled and the equipment number of the calling line 26*a*–26*n* is written into the Y-address 136 of the X-address 106 associated with the particular call back trunk 78 which has generated the REQ signal. During time slots TS49 – TS52 the equipment number of the called line is written into the memory 107.

The timing of the writing of information into the memory 107 is synchronized by write clock pulses which effectively "AND" with the incoming information. More specifically, a gating circuit 138 is provided and when gating circuit 138 is enabled, it has an output which sets a time slot flip-flop circuit 140 for four time slot pulses twice during each register time slot (sixty-four consecutive system time slots). The trailing edge of time slot TS18 enables gating circuit 138 to set time slot flip-flop circuit 140 and the gating circuit 138 is enabled at the end of time slot TS22 to reset the time slot flip-flop 140. Gating circuit 138 is enabled again by the trailing edge of time slot TS48 to set the time slot flip-flop 140 and enabled at the end of time slot TS52 to reset the time slot flip-flop 140. When time slot flip-flop circuit 140 and start flip-flop circuit 130 have been set, AND gate 124 is enabled by write clock pulses and the output of AND gate 124 enables pulse timing gating circuit 114 and each of write AND gates 126.

Figure 3:
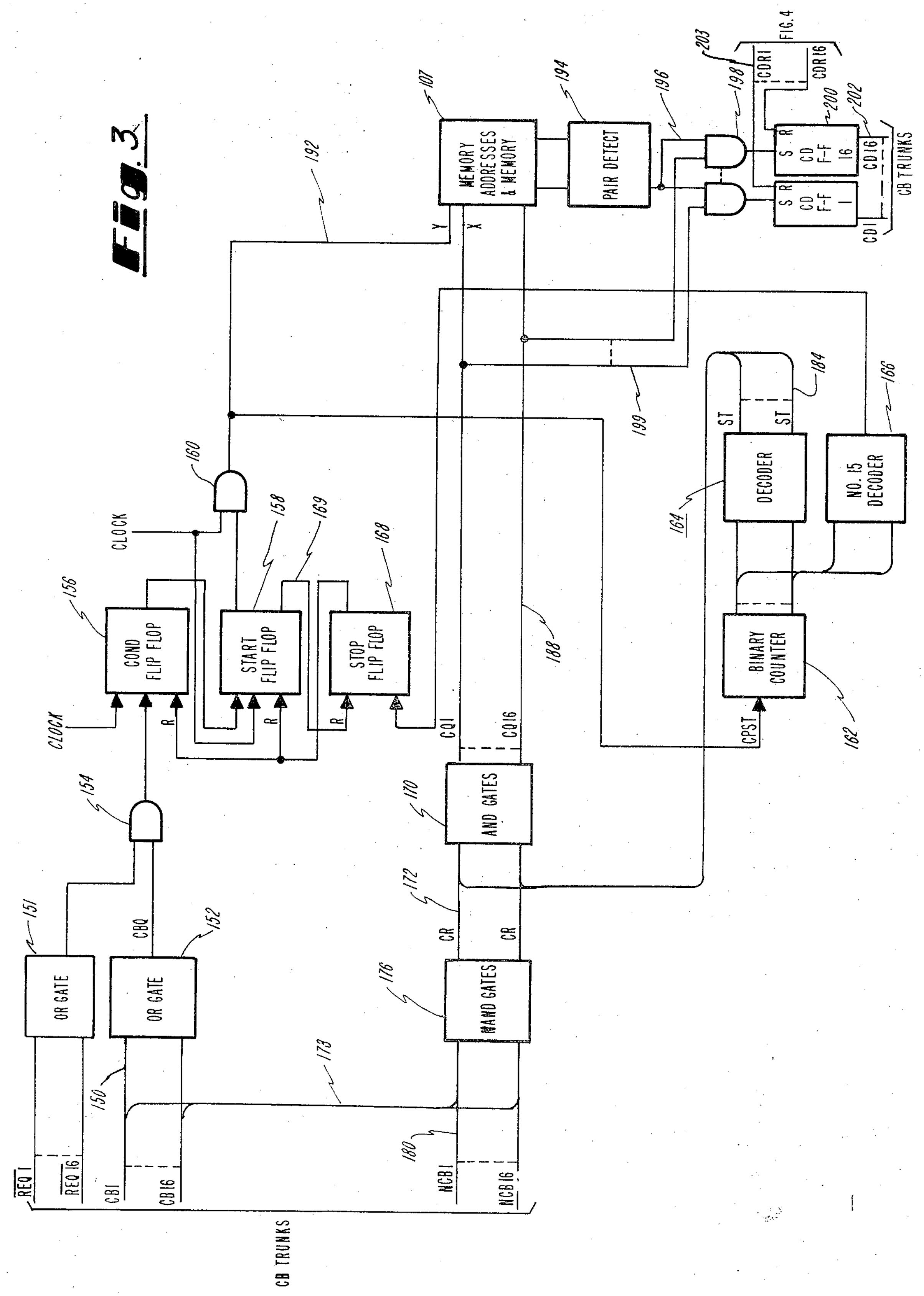
FIG. 3 is a block diagram showing the call back detect scanner, memory and related circuitry of the call back system arranged for scanning the memory and for reserving a call back trunk for automatic termination attempts upon the request of a subscriber.

Referring to FIG. 3, detect scanning of the memory 107 for stored pairs of equipment numbers and the reserving of call back trunks 78 at the request of the calling subscriber will now be described in detail. When a call back trunk 78 is not in the process of being initially seized for call back services, the absence of a REQ signal to the OR gate 151 applies an enable signal to one of the inputs to an AND gate 154. When the calling subscriber connected to a seized call back trunk 78 has dialed a nine after receiving a busy tone, a CB signal is generated over one of lines 150 from the call back trunk 78 to which the local junctor 28 has connected the calling line circuit 26*a*–26*n*. The CB output enables an OR gate 152 which has a CBQ output which enables the other input to the AND gate 154 which enables a conditioning flip-flop 156 which then may be set every second by clock pulses. When the conditioning flip-flop circuit 156 is set, it has an output which enables a start flip-flop 158 which is then set by clock pulses. The output of start flip-flop 158 drives an input to an AND gate 160. The AND gate 160 is enabled by each succeeding 125 KHz clock pulse and generates a CPST pulsing output. The CPST output drives a binary counter 162 in the call back detect scanner for sixteen counts (the number of call back trunks 78). The output of the counter is transmitted to a decoder 164 and to a number fifteen decoder 166. The decoder 164 decodes the count from binary counter 162 and transmits ST signals sequentially over consecutive ones of the lines 184 which are each connected to separate ones of the AND gates 170. The line 184 which transmits the ST signal identifies the memory address which is currently being scanned by the call back detect scanner preparatory to reserving a call back trunk 78 for attempting to complete a request call back call. Only one of lines 184 may have an ST signal present thereon at any given time. After sixteen (0 through 15) counts from binary counter 162, number fifteen decoder 166 has an output, which sets a stop flip-flop circuit 168 which in turn resets the conditioning flip-flop circuit 156 and the start flip-flop circuit 158. When start flip-flop circuit 158 is set it transmits a signal over a line 169 which resets stop flip-flop circuit 168. Addressing of the X-address of the memory 107 is performed by CQ signals which are transmitted over lines 188 by one of the AND gates in AND gates circuit 170 if an ST signal and a CR signal are present (on both the lines 172 and 184, respectively) as inputs to the AND gate for any particular X-address. A CR signal is generated by one of the NAND gates 176 if the "9" access code has been dialed by the subscriber, resulting in a CB signal being transmitted via lines 178 by a call back trunk 78. A CB input on a line 178 will enable a corresponding one of the NAND gates 176 to generate a CR output as long as an NCB signal from a call back trunk 78 (which indicates that a stored pair in the memory has already been detected and that the call back trunk 78 associated with the X-address of the detected pair has already been reserved) is not present on the corresponding one of lines 180.

The pulsing output of AND gate 160, which is transmitted over line 192 is applied to the tens digit store in all of the Y-addresses for both the calling and called equipment numbers. If a pair of equipment numbers is stored in the Y-address corresponding to the X-address currently being detect scanned by the CQ signal transmitted over one of the lines 188 a pair detect circuit 194 is energized and drives (via lines 196) one input to each of sixteen AND gates 198. The CQ signal present on one of the lines 188 is also transmitted via one of lines 199 to one of the AND gates 198 which is enabled and sets one of CD flip-flops 200 which transmits a CD signal via one of the lines 202 to one of call back trunks 78. The CD signal energizes a CD relay (discussed in greater detail below) in that call back trunk 78 and reserves that call back trunk 78 for call back attempts to the calling and called lines identified by the information stored in the memory address location in which that equipment number pair was detected.

The call back trunk 78 remains dedicated to call back attempts made to the calling and called lines identified by the information stored in that memory address location for a predetermined number (for example, eight) of termination attempts to the called and calling lines. If the call back call is not successfully completed (for example, if the called line remains busy) after the predetermined number of attempts, then a CDR signal is transmitted via one of lines 203 by an attempt counter 271 (to be discussed in greater detail below) to the CD flip-flop 200 which reserved the call back trunk 78. The CDR signal resets the CD flip-flop 200 which removes the CD signal from the connected line 202 and releases the call back trunk 78.

Figure 4:
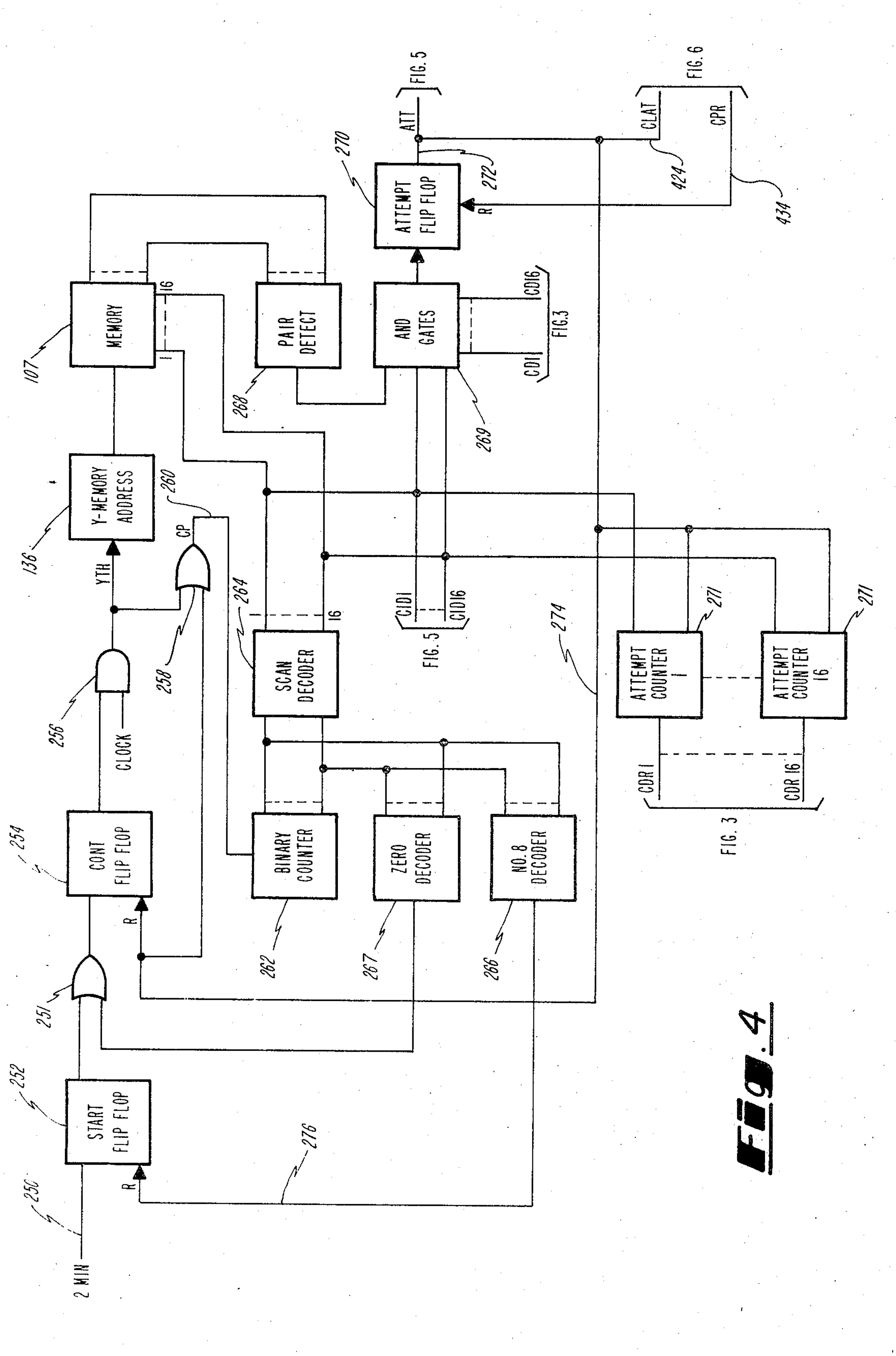
FIG. 4 is a block diagram showing the call back scanner, memory and related circuitry of the call back system arranged for periodic scans of the memory for stored call back attempts preparatory to initiation of call back termination attempts.

Referring now to FIG. 4, the initiation of call back attempts following storage of a pair of equipment numbers in the memory will be discussed in greater detail.

Every two minutes a two MIN pulse is transmitted by a supervisory clock over line 250 and sets a start flip-flop circuit 252, which in turn, sets a control flip-flop circuit 254 via an OR gate 251. When the control flip-flop is set, an AND gate 256 is enabled by sixty IPM clock pulses and has an output YTH to the memory Y-addresses 136 and to an OR gate 258. When OR gate 258 is enabled, CP clock pulses are transmitted over line 260 and drive a binary counter circuit 262. The output of the binary counter circuit 262 is transmitted to an X-address scan decoder circuit 264 to provide signals, which cause the sequential scanning of the X-addresses of the memory 107. In addition, the output of the binary counter circuit 262 is transmitted to a number eight decoder 266 which resets the start flip-flop 252 after the count of eight. However, the control flip-flop 254 remains set by a zero decoder circuit 267 until a count of zero is reached in the counter 262 indicating that all the X-addresses in the memory 107 have been scanned. The scan decoder 264 is also connected to apply scan pulses to an AND gate circuit 269 which is connected to receive enabling signals from the CD flip-flop 200 (FIG. 3) and from a pair detect circuit 268. If a stored pair of equipment numbers is detected in the Y-address location of an X-address in the memory 107 as the addresses are scanned, the pair detect circuit 268 is enabled to apply an enabling pulse to all the AND gates 269. If in addition, a CD flip-flop 200 (FIG. 3) corresponding to the call back trunk 78 dedicated to the X-address has been set a corresponding one of the AND gates 269 is enabled and an attempt flip-flop 270 is set via the AND gate circuit 269. The attempt flip-flop 270 transmits an ATT signal over line 272 to a steer-out enable flip-flop 308 (FIG. 5), and over line 274 to temporarily reset the control flip-flop 254, and a CPR signal over line 434 which initiates the release sequence. Each time that AND gate 269 is enabled, it sets the attempt flip-flop circuit 270 and a termination attempt is initiated. The attempt flip-flop circuit 270 is reset by a CLAT signal which is transmitted over line 424 by the release sequence circuitry (as will be described in greater detail below). When the attempt flip-flop 270 is reset, the control flip-flop 254 is set by the zero decoder 267 and the clock pulses are again applied to the counter 262 so that the decoder 264 again continues to scan the X-address of the memory 107 for another attempt request. Attempts will continue until the counter 262 has passed the count of sixteen and reached zero, at which time the counter 262 will be reset and no further attempts will be made until the next two MIN signal pulse sets the start flip-flop 252.

An attempt counter circuit 271 is provided for each call back trunk. The attempt counters 271 are connected to the scan decoder 264 and the line 274 so that a count will be applied to the counters each time an attempt is made to make a call back connection to its associated call back trunk 78. After a preset number of attempts have been made, the corresponding counter 271 applies a reset signal CDR to the corresponding CD flip-flop 200 (FIG. 3) and releases the call back trunk 78 from servicing that request.

Figure 5:
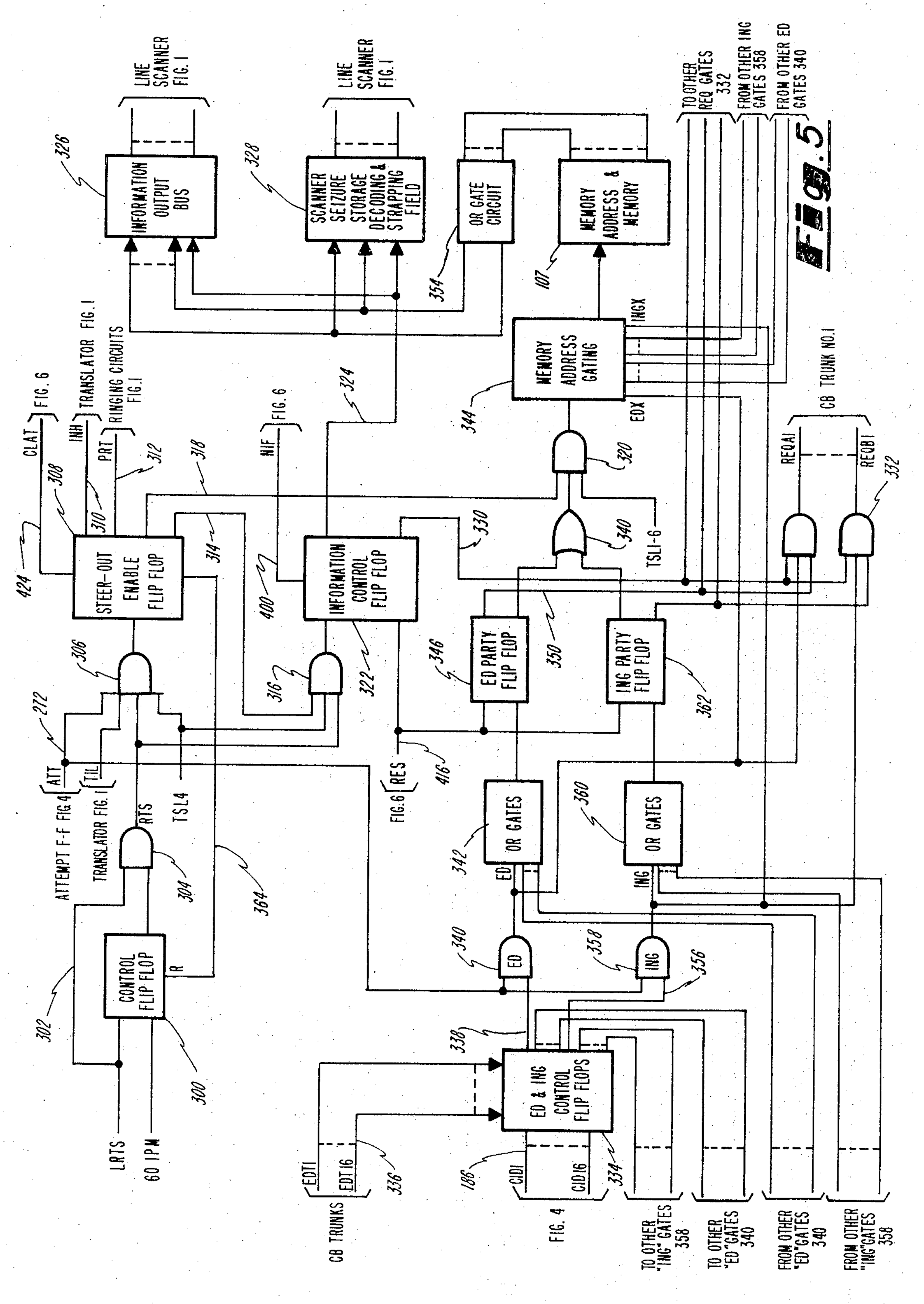
FIG. 5 is a block diagram showing the steering-out control circuitry, memory and information output circuitry arranged to steer out information during a call back termination attempt.

Referring now to FIG. 5, the steering-out of stored data from the memory 107 by the automatic call back control system 22 will be described in detail. As was previously mentioned, the operations of the automatic call back system 22 are synchronized with the operations of number translator 46 and the steering-out operations are performed during a free register time slot (the last register time slot or "LRTS") of number translator 46. during the last register time slot, an LRTS signal is transmitted by number translator 46 to a control flip-flop 300 and via line 302 to an AND gate 304. The control flip-flop 300 is set by 60 IPM clock pulses and each time that the control flip-flop 300 is set, the AND gate 304 is enabled and transmits an RTS signal to an AND gate 306. The AND gate 306 is enabled if the attempt flip-flop 270 has been set, and the number translator 46 is idle during line scanner time slot TSL4. When the AND gate 306 is enabled it sets a steer-out enable flip-flop circuit 308. The steer-out enable flip-flop circuit 308 transmits (to number translator 46) an inhibit ("INH") signal (via line 310) which prevents number translator 46 from performing other functions. Steer-out enable flip-flop 308 also transmits a premature ring trip (PRT) signal (via line 312) which prematurely trips ringing circuits 30 to prevent ringing and transmits outputs over line 314 to an AND gate 316 and over line 318 to an AND gate 320. If the AND gate 304 is enabled during line scanner time slot TSL4 and the steer-out enable flip-flop circuit 308 has been set, the AND gate 316 is enabled and sets an information control flip-flop 322. The information control flip-flop 322 transmits via line 324 a signal which prepares an information output bus 326 and a scanner seizure, storage, decoding and strapping field 328 (which identifies the line scanner which is to be used in terminating to the called line and the line scanner which is to be used in terminating to the calling line) and enables via line 330 one input to each of thirty-two AND gates 332. (Two AND gates 332 are associated with each of call back trunks 78 as will be explained in greater detail below.) Thirty-two called and calling (ED and ING) control flip-flop circuits 334 are provided (One called control flip-flop circuit and one calling control flip-flop circuit is associated with each of the sixteen lines 186.) and are each arranged to be set by the CID signal (which identifies the X-address which is being interrogated) present on one of lines 186. The ED control flip-flop circuits are set in the absence of an EDT signal (An EDT signal indicates that the termination to the called number has been completed.) transmitted over one of lines 336 by the particular call back trunk 78 associated with the X-address in the memory which is being interrogated. If an EDT signal has been generated by the call back trunk 78, then the calling control flip-flop circuit corresponding to that X-address is set. When a called control flip-flop circuit has been set, it transmits a signal via one of sixteen lines 338 to one of sixteen AND gates 340 (only one shown in FIG. 5) which are each associated with a particular call back trunk 78 which is enabled when the attempt flip-flop 270 (FIG. 4) has been set. The AND gate 340 transmits an ED signal to one of OR gates 342 and an EDX signal to memory address gating circuits 344. When one of OR gates 342 is enabled, an ED (called) party flip-flop 346 is set and transmits a first signal via an OR gate 340 to the AND gate 320. The AND gate 320 is enabled during line scanner time slots TSL1 – TSL6 which enables the memory address gating circuits 344. The ED party flip-flop 346 also transmits a signal via line 350 which drives a second input of sixteen of AND gates 332. (Of the thirty-two AND gates 332, sixteen are each arranged, when enabled, to transmit a REQA signal to the call back trunk 78 with which it is associated to initiate a request for a termination attempt to the called line and sixteen are each arranged, when enabled to transmit a REQB signal to the call back trunk 78 with which it is associated to initiate a request for a termination attempt to the calling line.) The AND gate 340 also transmits the EDX signal to the AND gate 332 which is associated with the call back trunk 78 which has been reserved to service the call back request in the address identified by the EDX signal. The memory address gating circuit 344 gates the Y-address associated with the X-address being interrogated to read the called number from the memory 107 via OR gate circuit 354 to the information output bus 326 which sends the information to the common control system line scanner identified by the scanner seizure, storage decoding and strapping field 328 which is also enabled by OR gate 354. After the ED line has been terminated, an EDT signal is transmitted by the call back trunk 78 over lines 336 to the ED and ING control flip-flop circuits 334 and the ING control flip-flop 334 (associated with the line 186 which has a CID signal present thereon) is set and transmits a signal over one of sixteen lines 356 to one of AND gates 358 which is enabled. The enabled AND gate 358 transmits an ING signal to one of OR gates 360 which in turn is enabled and sets an ING party flip-flop circuit 362. The enabled AND gate 358 also identifies (via an INGX signal to memory address gating circuit 344) the particular X-address in the memory 107 which is to be interrogated and the INGX signal also enables the AND gate 332 associated with the call back trunk 78 which is servicing the call back request and that AND gate 332 transmits a REQB signal to the call back trunk 78. The stored calling line equipment number is sent out by the information output bus 326, to the common control system line scanner to attempt a termination to the calling line 26a–26n in a manner similar to that described above for attempting a termination to the called line.

When information control flip-flop 322 is set, an NIF signal is transmitted via line 400 to the release sequence circuitry to enable a release sequence and a release sequence circuitry (as described in greater detail below) which transmits a reset (RES) signal via line 416 which resets the information control flip-flop 322, the ED party flip-flop 346 and the ING party flip-flop 360.

When the steer-out enable flip-flop 308 is set, it transmits a signal over line 364 which resets control flip-flop 300. The steer-out enable flip-flop 308 is reset by a CLAT signal transmitted from the release sequence circuitry over line 424 as is described in greater detail below.

Figure 6:
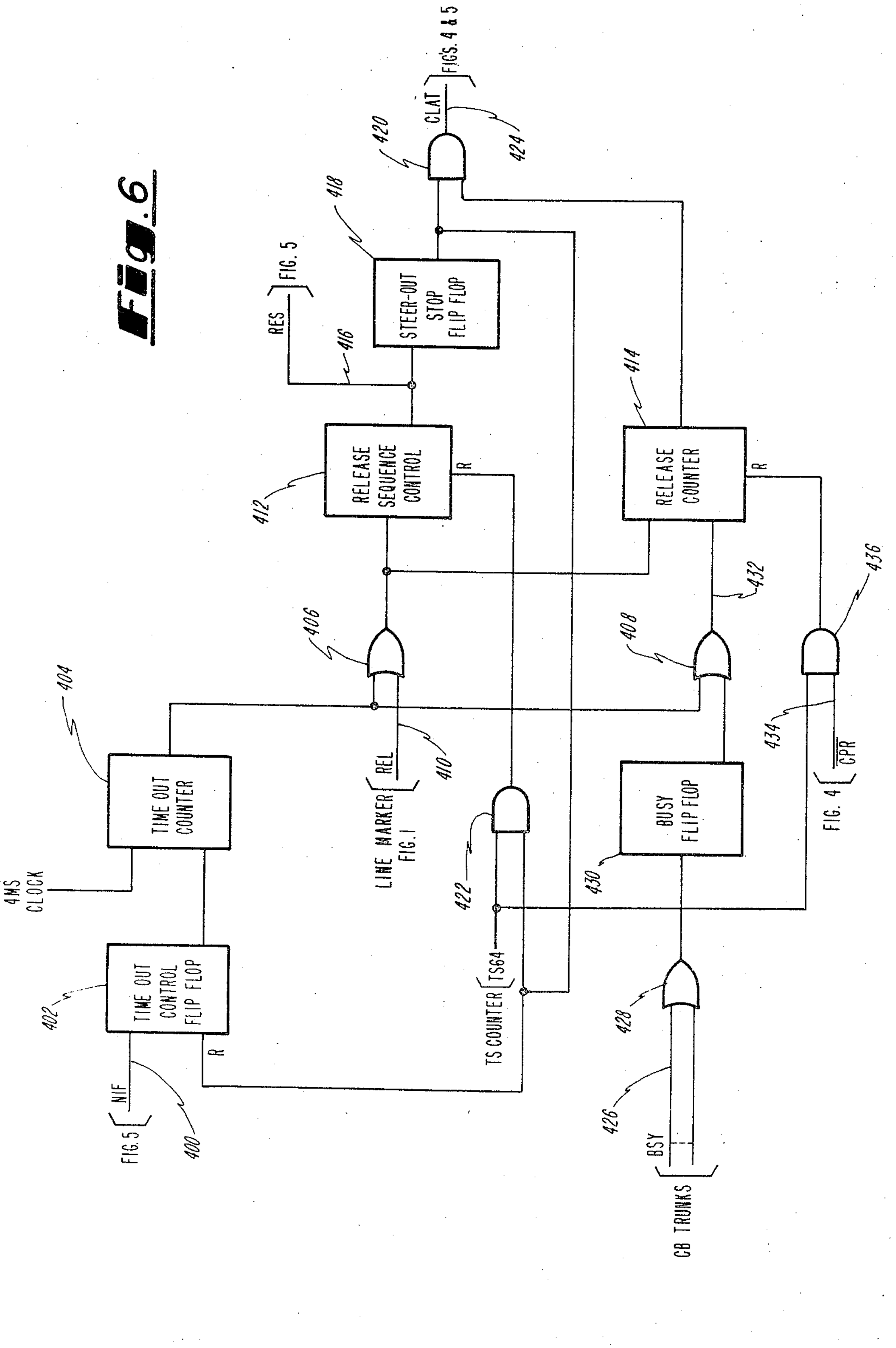
FIG. 6 is a block diagram showing the release sequence circuitry of the call back system.

Referring now to FIG. 6, the release sequence of operation of the automatic call back arrangement 22 will be described in detail. Each time that the automatic cell back arrangement 22 attempts a termination (either to a called line or to a calling line) the information control flip-flop circuit 322 (FIG. 5) is set and transmits a signal to a call back trunk 78 to request service from junctor control 32 to assist in the termination attempt. Each time an attempted termination is completed, line marker 50 transmits a release (REL) signal over line 410 to OR gate 406. When OR gate 406 is enabled, a release sequence control flip-flop circuit 412 and a release counter flip-flop circuit 414 are set. When release sequence control flip-flop circuit 412 is set, a reset (RES) signal is transmitted over line 416 to information control flip-flop 322 and to the ED and ING party flip-flop circuits 342 and 360 respectively, of FIG. 5, and a steer-out stop flip-flop circuit 418 is set. The output of the steer-out stop flip-flop 418 drives inputs to AND gates 420 and 422. In addition, when the steer-out stop flip-flop circuit 418 is set, it resets the time-out control flip-flop circuit 402 which is utilized only when the release pulse does not occur. The output of the release counter flip-flop circuit 414 drives the other input to AND gate 420, and when the AND gate 420 is enabled a clear attempt (CLAT) signal is transmitted over line 424 and resets attempt flip-flop circuit 270 and the steer-out enable flip-flop circuit 308 (FIGS. 4 and 5).

In addition, if the call back trunk 78 which is being utilized during a termination attempt detects either a busy called line or a busy calling line, the call back trunk transmits a busy (BSY) signal over lines 426 which enables an OR gate 428 which in turn sets a busy flip-flop circuit 430. The output of the busy flip-flop circuit 430 defines a second input to the OR gate 408 and when OR gate 408 is enabled, an artificial second release signal is transmitted via line 432 to release counter flip-flop circuit 414 which is set and in turn enables the AND gate 420 to generate the CLAT signal. When the steer-out stop flip-flop 418 is set, it resets time-out control flip-flop 402 and during time slot TS64 enables an AND gate 422 which resets the release sequence control flip-flop circuit 412. If a $\overline{CPR}$ signal is present on line 434 during time slot TS64, and AND gate 436 is enabled which resets the release counter flip-flop circuit 414.

The information control flip-flop circuit 322 when set applies an NIF signal over line 400 to a time-out control flip-flop circuit 402 which enables a time-out counter 404, arranged to be driven by 4 millisecond clock pulses, to begin counting. The output of the time-out counter 404 drives inputs to OR gates 406 and 408, and initiates the release sequence if a release pulse has not been received within approximately 0.5 seconds after the time-out control flip-flop 402 was set.

Figure 7:
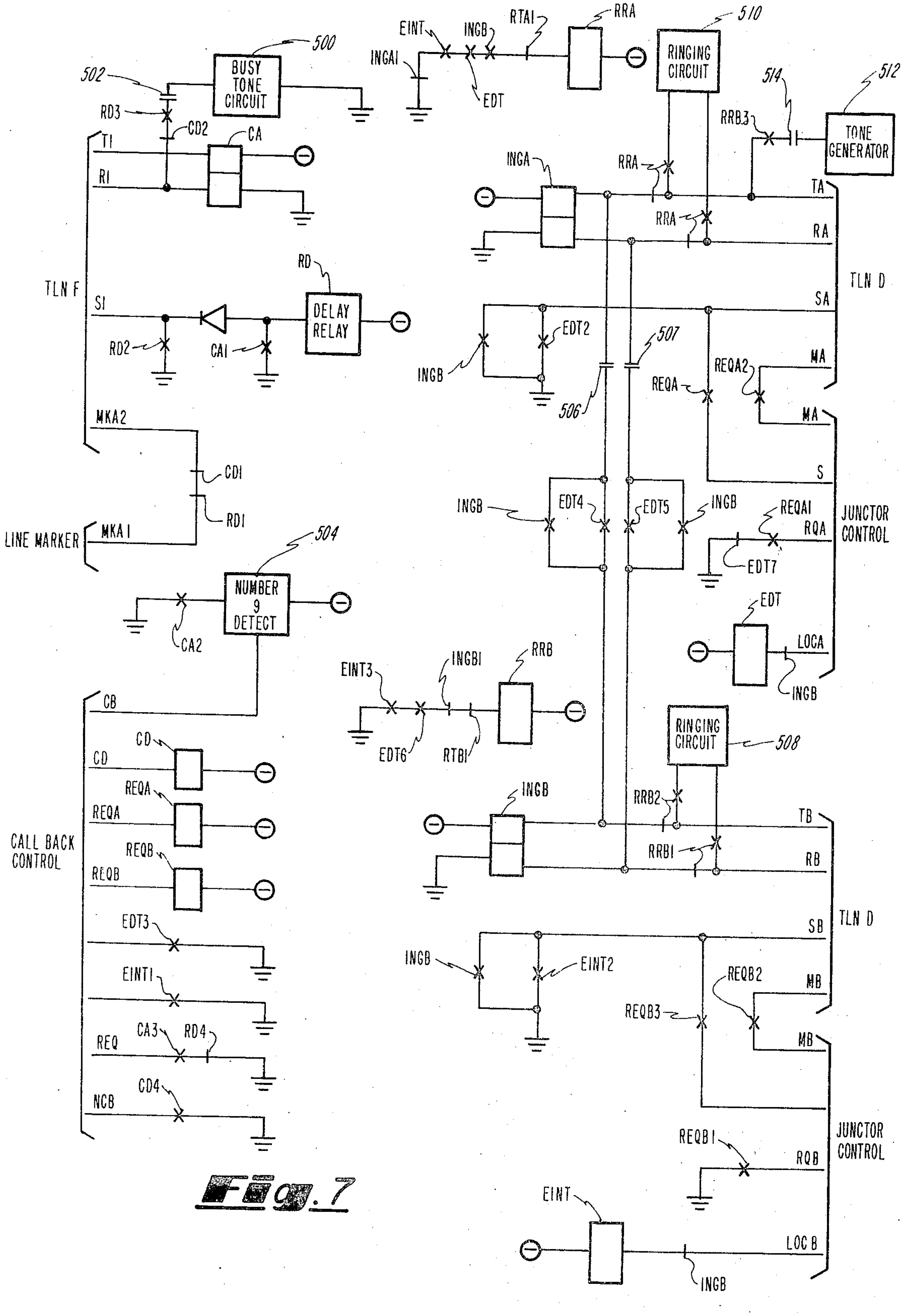
FIG. 7 is an electrical schematic wiring diagram of portions of a call back trunk which are associated with automatic call back operations.

Referring now to FIG. 7, the operation of the call back trunk 78 will be described in greater detail. After the calling party dials the number of a busy party, the line scanner-marker 50 applies a mark battery signal to a call back trunk 78 via a line MKA1. The mark battery is applied through the closed contacts RD1 and CD1 and lead MKA2 to the F stage of the TLN 52. The junctor control 32 initiates a connection through the TLN 52 to the calling party 26a–26n at which time the loop is completed and the relay CA is operated. The relay CA applies (via contacts CA1) a ground signal to the sleeve lead S1 and also operates a delay relay RD which maintains (via contacts RD2) the sleeve lead grounded. A busy signal is applied by a busy tone circuit 500 through a capacitor 502 and relay contacts RD3 and CD2 to the ring lead R1 of the connection indicating to the calling party 26a–26n that the requested connection cannot be established. The calling party now dials the number 9 (call back code) which is repeated by the CA relay and applied to a number nine detect circuit 504, which in turn, applies a call back request (CB) signal to the call back control 80 via lead CB. In response to the call back request signal, the call back control 80 determines that a pair of numbers is stored in the X address of the memory which is dedicated to the call back trunk 78 and applies ground to the lead CD operating the relay CD, thereby reserving the call back trunk 78 for subsequent call back services. The calling party now hangs up and the relays CA and RD drop out; however, the call back trunk 78 remains in a busy condition by the open contacts CD1.

The call back control 80 now proceeds every two minutes to search through the memory for call back requests. When it has located the request from this particular call back trunk 78, a ground signal is applied to the lead REQA which operates a relay REQA, which in turn, causes a ground signal to be applied via contacts REQA1 and EDT7 and lead RQA to the junctor control 32 enabling junctor control 32 to complete a connection between the call back trunk 78 and the called party line circuit previously stored in the memory during the initial connection of the calling party to the call back trunk 78. As was previously mentioned, the called line circuit is marked by line scanner-marker 50. The junctor control applies a mark potential via the leads MA and the contacts REQA2 to a D stage entry to the TLN 52. When a connection is established between the called party and the call back trunk 78, junctor control 32 applies a signal to the lead LOCA to operate a relay EDT. When the relay EDT operates, a ground is applied through the contacts EDT2 to the sleeve lead SA to hold the connection. A ground signal is set to the call back control 80 via contacts EDT3, and call back control 80 in turn, releases the relay REQA and opens (via contacts REQA2) the mark and sleeve leads MA to the junctor control 32. The EDT relay also interconnects the tip and ring leads TA and RA and TB and RB via contacts EDT4 an EDT5 and capacitors 506 and 507.

The call back control 80 now applies a ground signal to the lead REQB to operate the relay REQB which in turn applies a ground signal via contacts REQB1 to the junctor control 32 to establish a connection from the call back trunk 78 to the calling party **26*a*–26*n*. Junctor control 32 applies mark battery to the lead MB which is extended through relay contacts REQB2 to the other port connection to the D stage of the TLN 52. When a path is completed between the calling party 26*a*–26*n* and the call back trunk 78, the junctor control 32 applies a ground signal to the lead LOCB to operate the relay EINT. The relay EINT in turn applies a ground signal via contacts EINT1 to the call back control 80**, which in turn, removes the ground from the lead REQB to release the relay REQB. When the relay REQB is released, the mark and sleeve leads MB and SB are opened (by contacts REQB2 and REQB3, respectively). The relay EINT also applies a ground signal via contacts EINT2 to the sleeve lead SB to maintain the connection from this port to the calling party.

The relay RRB is operated via contacts EINT3, EDT6, INGB1 and RTB1 to connect a ringing circuit 508 to the tip and ring lines TB and RB for ringing the calling party **26*a*–26*n*. At the same time, a tone generator 512 is connected via a capacitor 514 and contacts RRB3 to apply a call waiting tone to the called party line in the event he goes off hook while a call back connection is being completed. When the called party answers, a ring trip circuit in the ringing circuit 508 is operated to open contacts RTB1 to release the relay RRB. A relay INGB is now operated by the completion of the loop. The contacts of relay INGB bypass the contacts EDT2, EDT4, EDT5 and EINT2 to maintain the connections to the call back trunks 78 under the control of the calling party 26*a*–26*n*. The relay INGB also drops out the relays EDT and EINT, and operates a relay RRA. The relay RRA completes a connection between a ringing circuit 510 and the tip and ring lines TA and RA for applying ringing signals to the called party. When the called party goes off hook, a ringing trip relay RTA in the ringing circuit 510** operates to open contacts RTA1 and reconnects the relay INGA to the tip and ring lines TA and RA, which in turn, signifies that the called party has answered. The contact INGA1 prevents the ringing of the called party in the event that he goes off hook just after the calling party answers.

Thus an automatic call back arrangement constructed in accordance with the present invention automatically stores pairs of calling and called numbers in the memory of a calling subscriber (with the automatic call back class of service) who has attempted to call a busy called line. Under this arrangement, the information is preserved at the time of the attempted connection and before the release of such data by the common control. The call back arrangement dedicates a call back trunk 78 at the request of the calling party for automatic call back operation, periodically scans the memory for stored equipment number pairs and, when such pairs are found, automatically attempts to first establish a connection to the called line which was busy (without ringing) and, after the called line has been connected, then attempts to make a connection to the calling line. The connection to the called line is first established to eliminate the possibility of the called party's line becoming busy while the call back connection is being effected to the calling line. While the called line is connected during the attempted connection to the calling line, a tone signal is applied to the called line, in the event the called subscriber goes off hook to indicate to the called subscriber that a call back connection is in progress. The automatic call back arrangement first rings the calling line and, after the calling subscriber goes off hook, then rings the called line. The automatic call back arrangement automatically makes a plurality of call back attempts and, after a preset number of attempts have been unsuccessful, automatically releases itself and abandons the requested automatic call back operations associated with the dedicated call back trunk 78. The call back trunk 78 remains under the control of the calling party once the connection has been established so that in the event that the calling party hangs up first, the call back trunk will be completely released and the called party will not have any direct control of the call back trunk 78 thereafter.

What is claimed is:

1. A call back arrangement for common control telephone systems comprising:

means for determining when a connection between a calling station and a called station cannot be completed by the common control;

means co-operating with the common control and effective upon a determination that a connection cannot be completed for connecting the calling station to means for receiving a signal from the calling station requesting the call be automatically retried, said means for connecting being arranged to transfer the identities of said calling and called stations from the common control to storage in said means for receiving upon connection of said calling station to said means for receiving;

means for determining when the called station is free and seizing the called station without signalling the called station;

means responsive to the seizure of the called station for ringing the calling station, and means, responsive to the answer of the calling station, for automatically completing the connection between the calling station and the called station and ringing the called station.

2. In a telephone system:

a switching network;

common control means responsive to the receipt of a called station number dialed by a calling subscriber station for controlling the establishment of a connection through said switching network between said calling and called stations and including means activated during the servicing of a call for determining when a connection cannot be completed between said stations, and means for determining the class of service of a calling party;

storage means, connected to said common control means, responsive to said determining means when a call cannot be completed, for storing the calling and called station identities, if the calling station has a call back class of service, and retry means connected to said calling station by said common control means for receiving a retry signal when a call cannot be completed and effective upon said storage of said station identities, including means for periodically causing the common control to attempt a connection through said network between said called station and said retry means and, if successful, for seizing said called station without signalling said called station, and means responsive on said seizure for causing the common control to attempt to complete a connection between calling and called stations through said network and retry means.

3. In a common control telephone system:

means operable under the control of a calling subscriber for attempting the completion of a connection between a calling station and a called station;

means for determining when a connection between the calling and called station cannot be currently completed;

means, effective upon such determination, for registering information concerning the identity of the calling and called stations when the calling party has the call back class of service;

means for accepting a signal from the calling station, having the call back class of service requesting that the call can be automatically retried;

means, responsive to the acceptance of said signal, for determining when the identified called station is free and thereafter seizing the called station without ringing the called station, and means effective upon said seizure of the called party line for automatically retrying the establishment of a connection between the identified calling and called stations.

4. A call back arrangement for telephone systems including a switching network and a common control for connecting stations through the network, the common control including circuits for receiving the identity of the station to be connected, for determining the class of service of calling parties and for determining when attempted connections cannot be completed between stations, and a call back arrangement comprising:

a plurality of call back trunks, each trunk including a detection circuit for detecting call back signals from stations connected thereto by common control to produce a call back request signal;

circuit means, responsive to a determination that a connection requested by a calling station having a call back class of service cannot be currently completed to a called party, for effecting the connection by the common control of a free call back trunk to the calling station;

storage circuit means, effective upon the connection of a call back trunk to a calling party, for receiving the identity of the calling and called stations from the common control and storing the identities of the called and calling parties along with the identity of the connected call back trunk;

circuit means, responsive to a call back request signal from a call back trunk, for transmitting a called station identity associated with the call back trunk to the common control for effecting a connection between the call back trunk and called station, and circuit means, responsive to the completion of a connection between a call back trunk and the called station, for transmitting the calling station identity associated with the call back trunk to the common control to effect a connection between the call back trunk and the calling party.

5. A call back arrangement as defined in claim 4 wherein:

each of said plurality of call back trunks include a busy tone circuit for applying a busy tone to a calling party when initially connected thereto in response to a determination that a requested call cannot be completed, and circuit means for terminating the busy tone is response to the detection of a call back request signal by said detection circuit.

6. A call back arrangement as defined in claim 5 wherein:

each of said plurality of call back trunks includes a first ringing circuit for applying ringing signals to the calling station when the calling station is connected to a call back trunk that was previously connected to a called station, and a second ringing circuit for applying ringing signals to the called station after the calling party answers.

7. A call back arrangement defined in claim 6 wherein:

each of said plurality of call back trunks includes a second tone circuit for applying a call waiting tone to said called station when connected to a call back trunk until the answer of the calling party.

8. A call back arrangement as defined in claim 4 wherein said call back trunks are connected to one side of said switching network and connection through said switching network of said called and calling station is effected to the other side of said switching network.

9. A call back arrangement as defined in claim 8 wherein said circuit means for effecting a connection between the call back trunk and called station include means for providing a premature ring trip signal to the called station.

10. A call back arrangement as defined in claim 9 wherein said circuit means for effecting a connection between the call back trunk and calling party include means for providing a premature ring trip signal to the calling station.

11. A call back arrangement as defined in claim 10 wherein said plurality of call back trunks include means to connect the calling station to the called station through individual ones of said call back trunks.

12. A call back arrangement as defined in claim 11 wherein said storage circuit means includes a plurality of memory addresses and means to write into a memory address, synchronously with said common control, the identity of the calling station and subsequently to write into the same memory address the identity of the called station.

13. A call back arrangement as defined in claim 12 wherein said address written into depends upon the particular call back trunk requesting service, whereby a unique address in said storage means is associated with each of said call back trunks.

14. A call back arrangement as defined in claim 13 wherein said storage means includes means for detecting the presence of said identities in said memory addresses and for producing an output when the coincidence of a call back trunk request and the detection of identities in the associated memory address occurs.

15. A call back arrangement as defined in claim 14 wherein each of said call back trunks include means, connected to said presence detecting means, effective upon detecting an output therefrom to reserve the call back trunk associated with the memory address where the presence of an identity was found and to generate an identity detected signal unique to said address.

16. A call back arrangement as defined in claim 15 wherein said storage means includes attempt means adapted to read identities stored in said addresses and to communicate said identities stored in said storage means both to said means for effecting a connection between the call back trunk anc called station and to said means for effecting a connection between the call back trunks and calling party.

17. A call back arrangement as defined in claim 16 wherein said storage means includes scanning means arranged to be enabled periodically, to scan said memory addresses sequentially for a stored identity pair and to enable a said attempt means connected to said common control when a said identity is found and the associated identity detected signal has been generated.

18. A call back arrangement as defined in claim 17 wherein said attempt means includes counting means for counting each attempt until a preset number is reached and thereupon terminating said identity detected signal.

19. A call back arrangement for a common control telephone system including a plurality of subscriber line circuits connectable by the common control through a switchable line link network to a plurality of ringing circuits and to a plurality of local junctors, wherein the plurality of local junctors and ringing circuits are further connectable by said common control through a switchable trunk link network to each other, thereby defining connecting paths between said line circuits, said call back arrangement comprising:

at least one of a plurality of call back trunks for establishing a call back path between two of said line circuits through the trunk link network;

call back control means connected to said common control and to said plurality of call back trunks for controlling the connection between said line circuits and for communicating supervisory signals to said common control and to said subscriber lines, and call back storage means for receiving the identities of said two line circuits from said common control and for storing said identities, said call back storage means being adapted to periodically release said identities, under the supervision of said call back control means, to the common control to attempt a termination between said two line subscribers.

* * * * *